July 29, 1930.  C. F. DRUMM, JR  1,771,487
DRIVING MECHANISM
Filed March 17, 1930
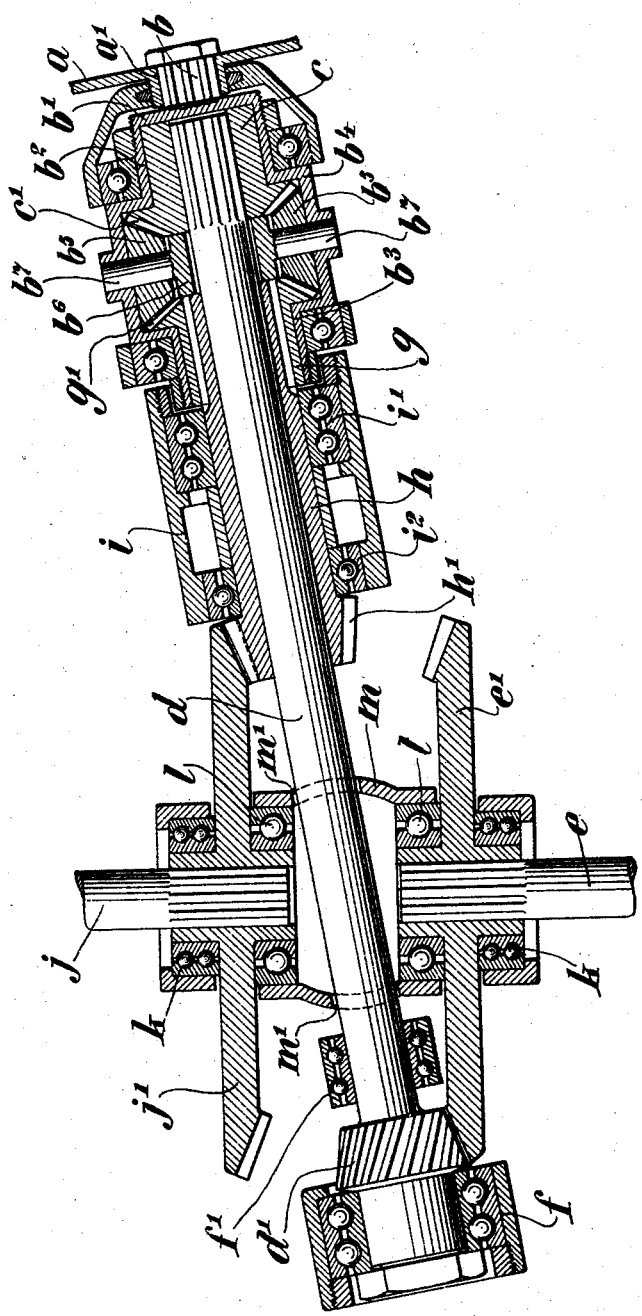
INVENTOR
Charles F. Drumm, Jr.,
BY
HIS ATTORNEYS Patented July 29, 1930

1,771,487

UNITED STATES PATENT OFFICE

CHARLES F. DRUMM, JR., OF JACKSON HEIGHTS, NEW YORK, ASSIGNOR TO INTERNATIONAL MOTOR COMPANY, OF NEW YORK, N. Y., A CORPORATION OF DELAWARE

DRIVING MECHANISM

Application filed March 17, 1930. Serial No. 436,386.

The present invention relates to a driving mechanism for motor vehicles and embodies, more specifically, an improved axle driving mechanism by means of which power may be apportioned between two aligned jack shafts.

In the usual final drive for motor vehicles the differential mechanism is constructed to include the power dividing and apportioning means as a unit carried within the housing enclosing the driven gears splined upon the jack shafts. This requires relatively large drive gears and pinions since the entire power must be transmitted through gears to the dividing unit.

The present invention proposes to divide the power prior to applying it to the final drive, thus permitting the drive gears and pinions of the final drive to be smaller than previously used in existing designs.

An object of the invention, accordingly, is to provide an axle driving mechanism by means of which the final reduction drive gears and pinions may be made comparatively small.

A further object of the invention is to provide a device of the above character by means of which the final drive and reduction is made comparatively small and relatively light in weight.

The foregoing objects are attained by providing a construction in which the differential is placed forwardly of the final drive in order that it may apportion the power between the jack shafts, the apportioned power being transmitted through a final drive mechanism which is constructed to afford the desired speed reduction.

Further objects, not specifically enumerated above, will be apparent as the invention is described more specifically in connection with the accompanying drawing, wherein, the single figure is a view in section, taken through the axis of a differential and final drive mechanism constructed in accordance with the present invention.

Referring to the above drawing, the driving element is indicated at $a$, preferably receiving power from a propeller shaft or other transmission mechanism of a motor vehicle. This driving member is formed as a disc having an aperture $a'$ within which a stub shaft $b$ is splined. This stub shaft is formed with a carrier $b'$ having aligned cylindrical bearing portions $b^2$ and $b^3$ and an enlarged cylindrical portion $b^4$. Within the enlarged cylindrical portion, bevel pinions $b^5$ are mounted, a spider $b^6$ being provided with radial arms $b^7$ which are mounted within the cylindrical portion $b^4$.

Within the cylindrical bearing portion $b^2$, a sleeve $c$ is journaled being formed with a bevel gear $c'$ for engaging the pinions $b^5$. Drive shaft $d$ is splined within the sleeve $c$ and transmits power from the apportioning means to jack shaft $e$ by means of a spiral hyperbolical pinion $d'$ and a gear $e'$ which is correspondingly formed to be driven by the pinion $d'$. A bearing $f$ is provided for the end of the shaft and an additional bearing $f'$ may be provided between the differential and the pinion $d'$. This bearing will take the driving torque reaction transmitted between the shafts $d$ and $e$.

Within the cylindrical bearing $b^3$, a sleeve $g$ is journaled, this sleeve being formed with a gear $g'$ which is engaged by the pinions $b^5$ and thus transmits power to a sleeve $h$ which is mounted upon shaft $d$ and journaled within a collar $i$ by means of bearings $i'$ and $i^2$. A spiral hyperbolical driving pinion $h'$ is formed upon the sleeve and engages a gear $j'$ carried by jack shaft $j$ to transmit the power from the sleeve to the jack shaft.

The jack shafts $e$ and $j$ may be journaled in suitably formed jack shaft housings in any well known fashion and are illustrated herein as being journaled at $k$ and $l$ upon opposite sides of the opposed gears $e'$ and $j'$. A carrier $m$ serves to maintain the jack shafts in alignment and is formed with apertures $m'$ through which the shaft $d$ passes.

From the foregoing, it will be apparent that the pinions and gears $h'$ and $d'$ and $e'$, $j'$, respectively, may be formed in smaller sizes than now used in the final drives where a reduction is to be provided in connection with the differential mechanism. This results in a lighter and more compact structure and is found to be highly desirable and serviceable.

While the invention has been described with specific reference to the accompanying drawings, it is not to be limited, save as defined in the appended claim.

I claim as my invention:

An axle driving mechanism comprising aligned driven shafts, spaced gears on the shafts, supporting means between the gears and maintaining the driven shafts in alignment, a shaft extending between the gears and carrying a pinion engaging one of the gears, said supporting means being apertured to receive the last mentioned shaft, a sleeve on the last named shaft carrying a pinion engaging the other of the gears, and means to apportion power between the sleeve and last named shaft.

This specification signed this 14th day of March, A. D. 1930.

CHARLES F. DRUMM, Jr.